Dec. 28, 1926.  
C. E. MAYNARD  
CUTTING TABLE  
Filed March 10, 1923
1,612,390
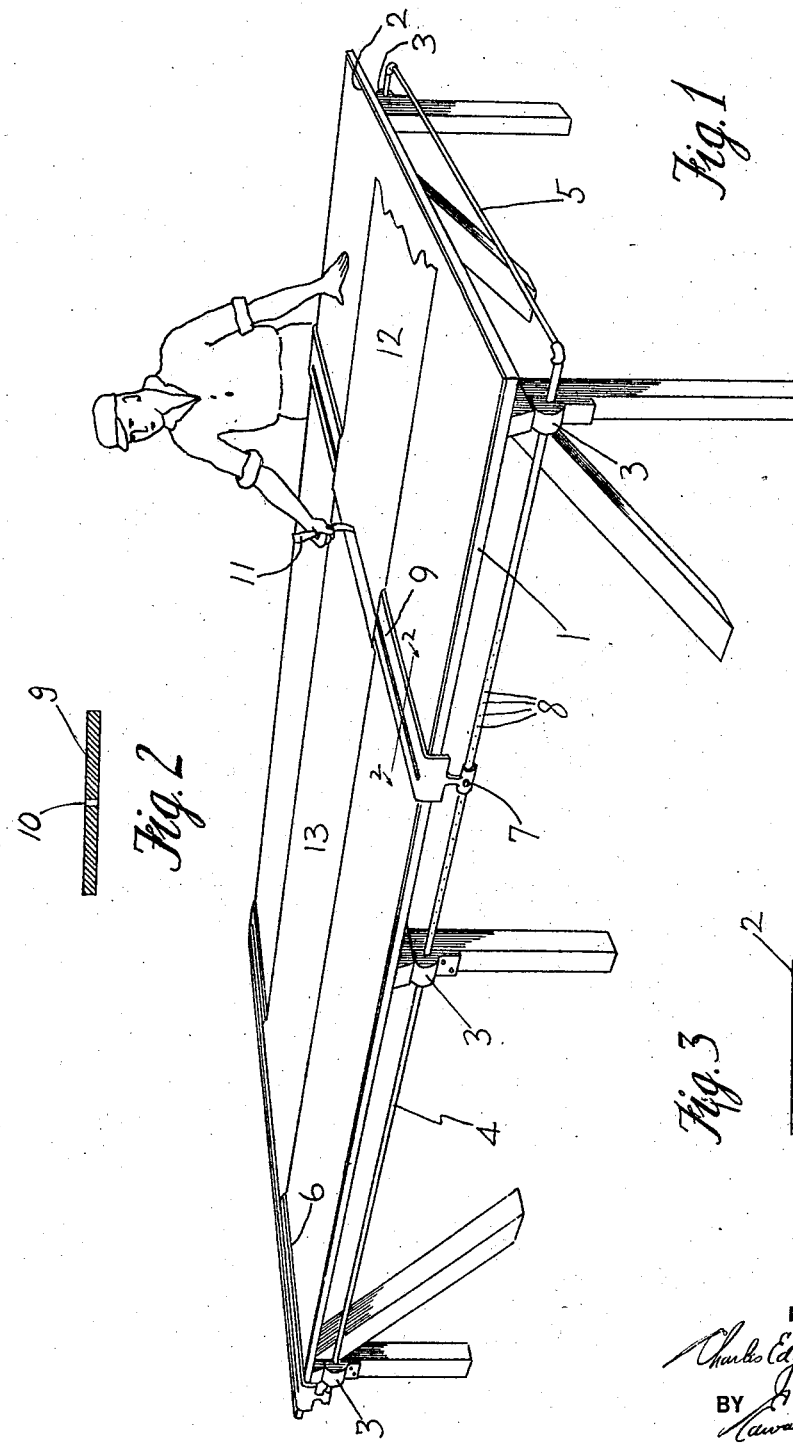
INVENTOR
Charles Edgar Maynard
BY
ATTORNEY Patented Dec. 28, 1926.

1,612,390

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

CUTTING TABLE.

Application filed March 10, 1923. Serial No. 624,095.

My invention relates to a cutting table particularly adapted for use in cutting sheet rubber stock. It has for its objects the improvement of existing devices from standpoints of economy, accuracy, and rapidity of operation. Various more detailed objects will appear from the description below.

In the manufacture of rubber tubes, a field where the present invention finds especial applicability, one method embraces the rolling upon a straight mandrel of proper size a strip of rubber long enough to produce a tube of the desired length, and wide enough to roll around the mandrel several times. The rubber stock used is tacky, adhesive, and hard to handle, and it is generally desirable to supply it to the tube-maker in rolls just as it comes from the calender. The tube-maker must cut the stock to the proper length before rolling the tube. For this purpose a cutting device is required that is quick in operation, easily adjustable to varying lengths of tubes to be made, operable without requiring too great accuracy in unrolling the stock and laying it on the cutting table, and involving a relatively small capital outlay, as a plurality of devices are necessary for a large production. To meet these requirements, I have provided the device illustrated in the accompanying drawings, in which Fig. 1 is a perspective view showing a piece of rubber stock being cut by the aid of the improved device;

Fig. 2 is a section on line 2—2 of Fig. 1; and

Fig. 3 is a fragmentary section of the table top.

In the drawings, 1 represents a table, supported on any suitable legs, and preferably covered with a sheet of boiler plate 2 to form a backing against which the material may be cut. Supported in bearings 3 on the legs of the table are sliding rods 4, connected for movement together by a cross-piece 5. Attached to the rods at one end is a cross-piece 6 serving as a cutter guide, and adjustably secured between the rods by pins 7 and holes 8 in the rods is a second cutter guide 9. Each cutter guide has a longitudinal slot 10 (Fig. 2) along which a knife 11 may be drawn by the operator.

In the use of the invention, a sheet of rubber 12 is drawn over the table top from a supply point such as a roll located to the right of Fig. 1, so as to overlie the cutter guides. If the end of the sheet needs trimming the operator may run a knife through slot 10 in cutter guide 6, otherwise the sliding frame comprising rods 4 and cutter guides 6 and 9 is shifted until the slot 10 in guide 6 comes adjacent the end of the sheet. The guide 6 thus forms a gauge by which guide 9 is positioned in correct relation to the end of the sheet. This automatically brings the slot 10 in guide 9 in the correct position so that if the operator runs his knife along it a piece 13 of the correct length will be severed from sheet 12. Cutter guide 9 can be adjusted by means of pins 7 and holes 8 to produce the desired length of strip, but when once adjusted the whole frame can be shifted forward or back without disturbing the adjustment. Great accuracy in laying the sheet 12 on the table prior to cutting is not required, as the frame can be shifted to correspond with the position in which the stock is laid. The cutting operation is very rapid, as the knife is guided during its whole stroke and requires little attention on the part of the operator.

Having thus described my invention, I claim:

A cutting device for use in cutting pieces of constant length successively from a continuous strip comprising a table having a flat top, a frame slidingly mounted at the sides of the table below the level of the top thereof, a gauge supported by the frame and extending onto the surface of the table, and a cutting guide also carried by the frame and extending across the surface of the table, whereby when the gauge is set to the end of the strip the guide will be spaced therefrom the proper distance to guide a manually operated knife in producing a piece of the length desired.

CHARLES EDGAR MAYNARD.